US009084409B2

(12) United States Patent
Kornmayer et al.

(10) Patent No.: US 9,084,409 B2
(45) Date of Patent: Jul. 21, 2015

(54) CLUMP-FORMING HYGIENE GRANULATE AND METHOD FOR ITS PRODUCTION (71) Applicant: Xella Baustoffe GmbH, Duisburg (DE)

(72) Inventors: Ingrid Kornmayer, Munich (DE); Thomas Belzer, Koblenz (DE); Jens Scarbath, Rotenburg (DE); Thomas Scheidemann, Feldafing (DE); Henry Hantschick, Luebbenau (DE); Marion Ritter, Rotenburg (DE)

(73) Assignee: Xella Baustoffe GmbH, Duisburg (DE)

( * ) Notice: Subject to any disclaimer, the term of this patent is extended or adjusted under 35 U.S.C. 154(b) by 0 days.

(21) Appl. No.: 14/450,473

(22) Filed: Aug. 4, 2014

(65) Prior Publication Data

US 2015/0040833 A1 Feb. 12, 2015

(30) Foreign Application Priority Data

Aug. 6, 2013 (DE) .......................... 10 2013 013 078

(51) Int. Cl.
*A01K 29/00* (2006.01)
*A01K 1/015* (2006.01)
*B05D 1/34* (2006.01)

(52) U.S. Cl.
CPC ............. *A01K 1/0154* (2013.01); *A01K 1/0152* (2013.01); *A01K 1/0155* (2013.01); *B05D 1/34* (2013.01)

(58) Field of Classification Search
CPC .. A01K 1/0155; A01K 1/0154; A01K 1/0152
USPC .................... 119/173, 171; 427/214
See application file for complete search history.

(56) References Cited

U.S. PATENT DOCUMENTS

| 5,609,123 | A  | * | 3/1997  | Luke et al. ..................... 119/173 |
| 5,975,019 | A  | * | 11/1999 | Goss et al. ..................... 119/173 |
| 6,210,625 | B1 | * | 4/2001  | Matsushita et al. ........... 264/610 |
| 6,371,050 | B1 | * | 4/2002  | Mochizuki ..................... 119/172 |
| 6,887,570 | B2 | * | 5/2005  | Greene et al. ................. 428/403 |
| 8,733,288 | B2 | * | 5/2014  | Winkleman et al. .......... 119/173 |
| 2004/0079293 | A1 | * | 4/2004 | Rasner et al. .................. 119/172 |
| 2009/0255478 | A1 | * | 10/2009 | Wadams et al. ................ 119/173 |

(Continued)

FOREIGN PATENT DOCUMENTS

DE 198 39 240 A1 3/2000
DE 198 43 887 C5 8/2009

(Continued)

*Primary Examiner* — Yvonne Abbott-Lewis
(74) *Attorney, Agent, or Firm* — Collard & Roe, P.C.

(57) ABSTRACT

A clump-forming hygiene granulate has individual granules, each granule having: at least one inner carrier grain of a porous, mineral, non-swelling carrier material; an intermediate layer mantling the carrier grain or grains including a mixture containing at least one powder of a non-swelling, mineral, porous material, and a gel matrix composed at least of starch that swells in cold water, and a hydrocolloid different from starch, which swells in cold water; bentonite powder or superabsorber meal disposed between the carrier grain or grains and the intermediate layer; an outer mantle layer sheathing the intermediate layer, having a mantle layer surface including a mixture containing at least a powder of a non-swelling, mineral, porous material, and bentonite powder; hydrocolloid gel that swells in cold water, disposed between outer mantle layer and intermediate layer; and hydrocolloid grains of a hydrocolloid that swells in cold water, distributed on the mantle layer surface.

35 Claims, 2 Drawing Sheets

(56) References Cited

U.S. PATENT DOCUMENTS

2014/0069346 A1* 3/2014 Lipscomb et al. ............ 119/171
2014/0165921 A1* 6/2014 Raymond et al. ............ 119/173
2015/0040833 A1* 2/2015 Kornmayer et al. .......... 119/173

FOREIGN PATENT DOCUMENTS

| DE | 10 2008 048 736 B4 | 8/2012 |
| WO | 2010/034457 A1 | 4/2010 |

* cited by examiner

CLUMP-FORMING HYGIENE GRANULATE AND METHOD FOR ITS PRODUCTION

CROSS REFERENCE TO RELATED APPLICATIONS

Applicant claims priority under 35 U.S.C. §119 of German Application No. 10 2013 013 078.6 filed Aug. 6, 2013, the disclosure of which is incorporated herein by reference.

BACKGROUND OF THE INVENTION

1. Field of the Invention

The present invention relates to a clump-forming hygiene granulate, particularly an animal litter, preferably a cat litter, and to a method for its production.

2. Description of the Related Art

In the case of hygiene granulate, a distinction is made essentially between two different types, namely between light-weight litters and clump-forming litters. Light-weight litters have a great absorption capacity for liquids, above all urine, and good odor binding with low bulk density. The consistency of the light-weight litter does not change when it absorbs liquid. Light-weight litters consist, for example, of mineral grains that cannot swell, for example composed of autoclaved aerated concrete. In contrast to light-weight litters, clump-forming litters form firm agglomerates with the added liquid ("clumps"), which can be individually removed. As a result, material consumption and odor formation are less. Above all, clay minerals capable of swelling, particularly bentonite, and/or hydrocolloids are used as clump-forming materials. For this reason, clump-forming litters generally have a greater bulk density and are more expensive than light-weight litter. To reduce the bulk density of clump-forming hygiene granulates, it is furthermore known to use granules that consist of a core composed of material that cannot swell, for example autoclaved aerated concrete, which has a mantle of clump-forming material.

For example, a hygiene granulate is evident from DE 198 39 240 A1, which has granules that each have a core of calcium silicate hydrate material. The core has a surface coating composed of a substance that is capable of swelling and is sticky when moisture is added. This material is methyl cellulose or carboxymethyl cellulose, for example. For the production of the hygiene granulate, a thin coating of the dry substance that is capable of swelling and sticky when moisture is added is powdered onto the moist cores of calcium silicate hydrate material.

DE 198 43 887 C5 discloses a hygiene granulate on the basis of calcium silicate hydrate and bentonite, which has pelletized granules having a two-layer structure with a core composed of a primary pellet and a mantle. The core consists of a mixture of 85 to 95 mass-% calcium silicate hydrate material and 5 to 15 mass-% fine-particle bentonite, and the mantle has a mixture of fine-particle clay mineral capable of swelling and fine-particle calcium silicate hydrate. In this connection, the mixture has 35-65 mass-% calcium silicate hydrate material and 65-35 mass-% bentonite, and the fine-particle calcium silicate hydrate material has grain sizes of 1 to 100 μm. The primary pellet has grain sizes of 0.5-3.5 mm, and the granules of the granulate have grain sizes of 2-5 mm.

DE 10 2008 048 736 B4 discloses an animal litter composed of a porous carrier material that is coated with a clay mineral, where a layer of a non-ionic hydrocolloid is present between the carrier material and the clay mineral. The production of the animal litter takes place by moistening the carrier material with an aqueous solution that contains non-ionic hydrocolloid, and mixing the moistened carrier material with clay mineral. Subsequently, the mixture obtained is dried. The animal litter of DE 10 2008 048 736 B4 does form firm clumps at pH=6, but at other pH values the clumps are very sticky and smeary. The pH of cat urine can vary, however, for example due to illness. Then there is the risk that the sticky clumps become caught in the animals' fur.

SUMMARY OF THE INVENTION

It is the task of the present invention to make available a clump-forming hygiene granulate, particularly an animal litter, preferably a cat litter, having a low bulk density, which forms firm clumps when moisture, particularly urine, is added. At the same time, however, the stickiness of the clumps should not be too great. Furthermore, the hygiene granulate should have a great moisture absorption and retention capacity.

A further task is to make available a method for the production of such a hygiene granulate.

These tasks are accomplished by means of a hygiene granulate having the characteristics according to one aspect of the invention and by a method having the characteristics according to another aspect of the invention.

In accordance with one aspect of the invention, a clump-forming hygiene granulate, particularly animal litter, preferably cat litter, is provided wherein the hygiene granulate has a plurality of individual granules. A granule, in each instance, has:

a) at least one inner carrier grain composed of a porous, mineral, non-swelling carrier material, b) an intermediate layer mantling the carrier grain or the carrier grains, which layer consists of a mixture that contains at least one powder of a non-swelling, mineral, porous material, particularly calcium silicate hydrate powder, and a gel matrix composed at least of starch that swells in cold water, particularly is soluble in cold water, and a hydrocolloid different from starch, which swells in cold water, particularly is soluble in cold water, c) bentonite powder or superabsorber meal disposed between the carrier grain or the carrier grains and the intermediate layer, d) an outer mantle layer sheathing the intermediate layer, having a mantle layer surface, wherein the outer mantle layer consists of a mixture that contains at least a powder of a non-swelling, mineral, porous material, particularly calcium silicate hydrate powder, and bentonite powder, e) hydrocolloid gel that swells in cold water, particularly is soluble in cold water, particularly starch gel, disposed between the outer mantle layer and the intermediate layer, and f) hydrocolloid grains of a hydrocolloid that swells in cold water, particularly is soluble in cold water, distributed on the mantle layer surface.

In accordance with another aspect of the invention, a method is provided for the production of a clump-forming hygiene granulate having a plurality of granules composed, in each instance, of at least one carrier grain composed of a porous, mineral, non-swelling carrier material and a multi-layer mantling sheathing the carrier grain or the carrier grains, preferably for the production of an animal litter, preferably a cat litter, particularly for the production of a hygiene granulate according to one of the preceding claims, in a mixer operated in batch operation, having the following consecutive method steps:

a) production of a suspension composed of water, a powder of a non-swelling, mineral, porous material, particularly calcium silicate hydrate powder, starch meal, and a meal-type hydrocolloid different from starch, b) simultaneous addition of a granulate composed of the carrier grains and of bentonite powder and/or a superabsorber meal into the mixer, c) addition of a further hydrocolloid meal, particularly of starch meal, into the mixer, d) simultaneous addition of bentonite powder and calcium silicate hydrate powder into the mixer, and e) addition of a further hydrocolloid meal into the mixer, f) drying of the granules produced.

Advantageous further developments of the invention are discussed below.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
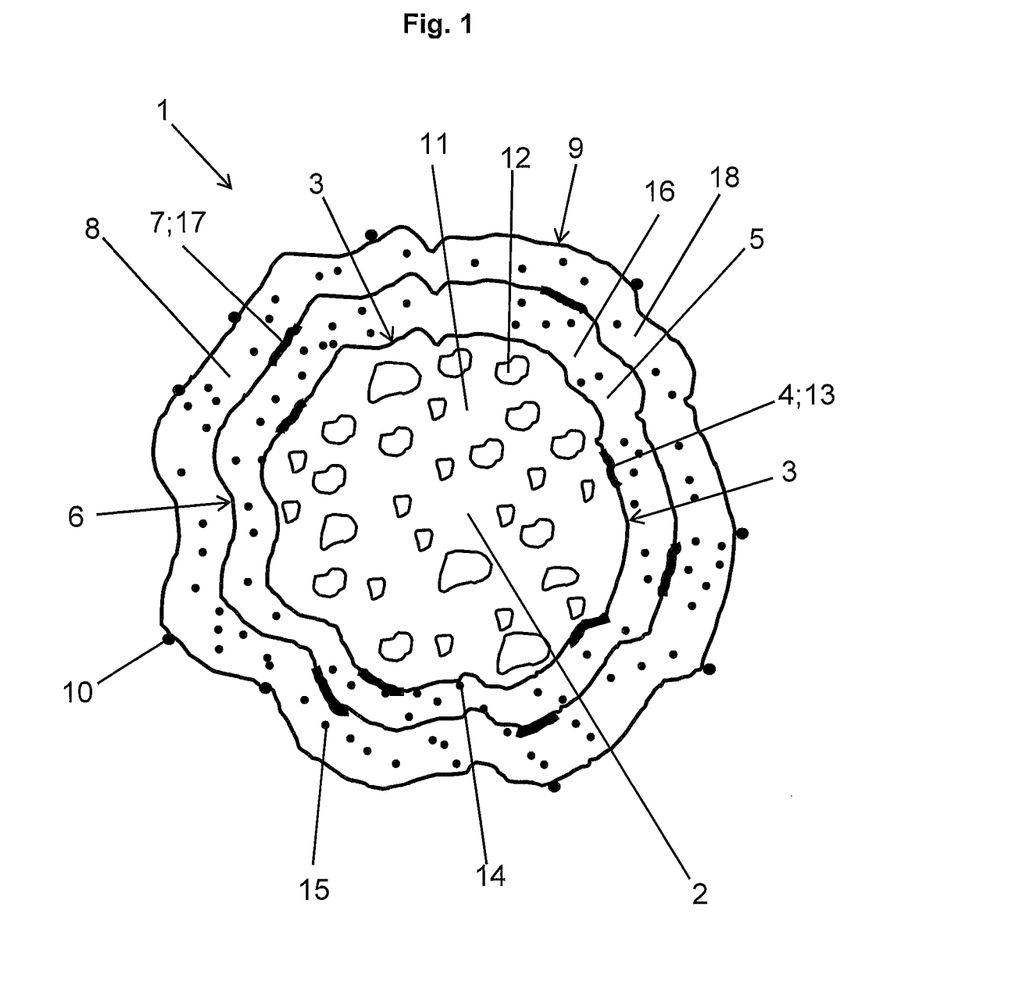
FIG. 1 shows, schematically, a granule of the hygiene granulate according to an embodiment of the invention, in cross-section.

The hygiene granulate according to the invention has a great number of individual granules 1 (FIG. 1). In this connection, a granule 1, in each instance, has an inner core or an inner carrier grain 2 composed of a porous, mineral, non-swelling carrier material having an outer grain surface 3 and a multi-layer mantling that completely encloses the carrier grain 2. A granule 1 has fine-particle bentonite 4 distributed on the grain surface 3, an intermediate layer 5 that mantles the carrier grain 2, having an intermediate layer surface 6, hydrocolloid gel 7 disposed on the intermediate layer surface 6, and an outer mantle layer 8 that sheathes the intermediate layer 5, with a mantle layer surface 9 and hydrocolloid grains 10 of a hydrocolloid distributed on the mantle layer surface 9.

The mineral, porous carrier material of the carrier grain 2 is preferably calcium silicate hydrate material, particularly autoclaved aerated concrete material. Calcium silicate hydrate material is a material that has strength-imparting calcium silicate hydrate phases that form a crosspiece matrix. Pores are embedded in the crosspiece matrix, as are aggregates and/or additives. In the case of autoclaved aerated concrete material, this material is a hydrothermally hardened, aerated calcium silicate hydrate material. It is produced from aqueous mixtures composed of at least one mineral binder, which contains at least one CaO component that can react in a hydrothermal process, for example cement or burnt lime or lime hydrate, and at least one $SiO_2$ component, for example quartz powder or flue ash, a propellant, particularly aluminum powder and/or paste, as well as inert additives and/or aggregates, if applicable. The aqueous mixture is cast into molds, aerated, and allowed to become partly solid, if necessary cut, and subsequently subjected to steam hardening. If the autoclaved aerated concrete is produced with foam, pre-finished foam is mixed in, in place of the propellant.

The carrier grain 2 thereby has a crosspiece matrix 11 composed of mainly calcium silicate hydrate phases and pores 12 embedded into the crosspiece matrix 11. Furthermore, other known aggregates, additives and/or admixtures can be contained in it, distributed in the crosspiece matrix 11. Furthermore, the carrier grains 2 of the hygiene granulate according to the invention preferably have a grain size ≤6 mm, especially ≤4 mm. In particular, the carrier grains 2 of the hygiene granulates according to the invention have a grain size distribution of 0.5 to 6 mm, preferably 1 to 4 mm according to DIN EN 933/1.

As has already been explained, a fine-particle bentonite or bentonite powder 4 is present on the outer grain surface 3. In this connection, the bentonite powder 4 is particularly disposed so as not to cover the full area, but rather is distributed irregularly over the entire grain surface 3. Preferably, the bentonite powder 4 is disposed in the form of planar material accumulations or material enrichments or material piles or material agglomerates or spots 13 distributed over the entire grain surface 3. Preferably, the bentonite powder 4 is smeared onto the grain surface 3. Furthermore, the bentonite powder 4 can also be partly disposed in the pores 12 of the carrier grain 2, which are open toward the grain surface 3.

Preferably, the bentonite 4 is Na-bentonite, because this material has a better swelling capacity. This better swelling capacity arises because Na ions tend toward hydration, in the adsorbed state, more than Ca ions, and thereby allow greater water absorption and swelling. At least, the bentonite powder 4 preferably contains mainly Na-bentonite. This Na-bentonite may have been formed naturally or may have been produced by adding soda (activated bentonite). Furthermore, the bentonite powder 4 preferably has a grain size ≤200 µm, especially ≤100 µm, according to DIN EN 933/1.

Instead of bentonite powder 4 or in addition, a superabsorber can also be used. Superabsorbers are synthetics that are able to absorb multiple times their own weight of polar liquids. These liquids are, above all, water or aqueous solutions. When it absorbs the liquid, the superabsorber swells up and forms a hydrogel. The sum of the volume of the liquid and the volume of the dry superabsorber remains the same when this happens.

As has already been explained, the intermediate layer 5 sheathes the carrier grain 2 and the bentonite powder 4 completely. The bentonite powder 4 is, and particularly the agglomerates 13 are, thereby disposed between the carrier grain 2 and the intermediate layer 5. The intermediate layer 5 itself consists of multiple components mixed and agglomerated with one another. According to the invention, the intermediate layer 5 contains a mixture of at least calcium silicate hydrate powder, gel-type starch that swells in cold water and is particularly also soluble in cold water, and a gel-type hydrocolloid that is different from starch, that also swells in cold water and is particularly also soluble in cold water. Preferably, the intermediate layer 5 consists of this mixture.

Hydrocolloids in the sense of the invention are, at least in part, water-soluble polysaccharides or proteins that form gels or viscous solutions in aqueous systems. Hydrocolloids can be produced synthetically, or modified naturally or chemically. The hydrocolloids have a thickening effect. In other words they increase the viscosity of the aqueous solution to which they are added. The thickening effect is based primarily on the binding of water. By means of the extraction of non-bound water, an increase in viscosity comes about. Starting from a characteristic concentration, network effects also occur, in addition to this effect; these effects lead to a generally over-proportional increase in viscosity. In this case, one says that molecules are "communicating" with one another, i.e. forming loops. For example, the molecules of the hydrocolloids interact by means of intermolecular interactions, such as hydrogen bridges, hydrophobic interactions or ion relationships. A gel is generally defined as a finely dispersed system composed of at least one solid and one liquid phase. In this connection, the solid phase forms a sponge-like, three-dimensional network, the pores of which are filled by a liquid (=lyogel) or a gas (=xerogel). A xerogel is therefore a porous solid having a network-like structure, which is produced from drying of a lyogel.

The calcium silicate hydrate powder or the fine-particle calcium silicate hydrate material of the intermediate layer 5 has individual calcium silicate hydrate grains 14. In this connection, the gel-type starch (=starch gel) and the gel-type hydrocolloid that is different from starch (=hydrocolloid gel) form a uniform, particularly extensively or partially dried gel mass or gel matrix or adhesive matrix 16, in which the calcium silicate hydrate grains 14 are distributed and in which the calcium silicate hydrate grains 14 are embedded.

The calcium silicate hydrate powder of the intermediate layer 5 preferably has a grain size ≤1000 μm, preferably ≤300 μm according to DIN EN 933/1. The finer the calcium silicate hydrate powder is, the more easily the intermediate layer 5 can be drawn onto the carrier grain 2 during production. The individual calcium silicate hydrate grains 14 consist of microporous calcium silicate hydrate material, particularly of autoclaved aerated concrete material. It lies within the scope of the invention to use at least one other fine-particle, non-swelling, mineral, porous material, for example limestone powder, instead of or in addition to the calcium silicate hydrate powder.

The starch of the intermediate layer 5 is preferably potato starch and/or corn starch that is soluble in cold water or swells in cold water. Hydrocolloids or starches that are soluble in cold water or swell in cold water already dissolve or swell in cold water at a temperature <15° C., preferably <10° C. Starch is not a chemically uniform substance. In plants, it is found in the form of starch grains that already differ, in terms of their properties and their chemical structure, even in the same plant, but particularly in different kinds of plants. In cold water, untreated starch only swells, but it does not dissolve. A water-impermeable sheath forms at the surface of the starch grains. If one gradually heats a suspension of starch grains in water, the starch grains swell more and more, until finally, a temperature is reached at which the starch forms a very viscous, colloidal solution, called starch paste. The temperature at which this conversion of the starch takes place is called the gelatinization temperature. At first, the sheath of the starch grains becomes water-permeable in this connection. Amylose and amylopectin accumulate water and swell. Gel formation starts. With continuing gel formation, the starch grains burst open, in other words they dissolve. This property allows even better water accumulation and swelling. Gradually, the starch gel forms completely. Starch that is soluble in cold water or swells in cold water is treated in such a manner that the solution processes or gel formation processes described already occur in cold water. For example, the starch is very finely ground, thermally pretreated or chemically modified for this purpose. The starch preferred according to the invention is soluble in cold water but not modified. In particular, it is potato starch.

The hydrocolloid that is different from starch and swells in cold water, particularly is soluble in cold water, is preferably hydroxyethylcellulose and/or carboxymethylcellulose and/or methylhydroxyethylcellulose and/or xanthan. Preferably, initial swelling of the hydrocolloid is furthermore delayed. A delay in initial swelling means that after the thickener is mixed with water, a certain amount of time still elapses until the thickener increases the viscosity of the mixture, but then this viscosity increase happens as suddenly as possible.

As has already been explained, a partially or extensively dried hydrocolloid gel 7 is present on the outer intermediate layer surface 6. In this connection, the hydrocolloid gel 7 is not disposed to cover the full area, but rather is distributed separately over the entire intermediate layer surface 6, in the form of spots or agglomerates 17. In particular, less than 50% of the intermediate layer surface 6 is covered with the hydrocolloid gel 7. The hydrocolloid gel 7 is preferably a starch gel that especially consists of potato starch and/or corn starch. The hydrocolloid gel 7 can also, however, consist of carboxymethylcellulose gel. The hydrocolloid gel 7 also swells in cold water, particularly is soluble in cold water.

As has already been explained, the intermediate layer 5 and the hydrocolloid gel 7 are completely sheathed or mantled by the outer mantle layer 8. Consequently, the hydrocolloid gel 7 is disposed between the intermediate layer 5 and the outer mantle layer 8. The hydrocolloid gel 7 thus serves as an adhesion mediator between the intermediate layer 5 and the outer mantle layer 8. The outer mantle layer 8 also consists of at least two solids mixed and agglomerated with one another. According to the invention, the mixture of the outer mantle layer 8 contains at least calcium silicate hydrate powder or fine-particle calcium silicate hydrate material composed of calcium silicate hydrate grains 15 and bentonite powder. Preferably, the mixture consists of these two components. In this connection, the bentonite powder forms a binder matrix 18 in which the calcium silicate hydrate grains 15 are distributed and in which the calcium silicate hydrate grains 15 are embedded.

If necessary, the outer mantle layer 8 can also contain a hydrocolloid that swells in cold water, particularly is soluble in cold water, which forms the binder matrix 18 together with the bentonite powder.

The calcium silicate hydrate powder of the outer mantle layer 8 preferably has a grain size ≤1000 μm, especially ≤300 μm according to DIN EN 933/1. The individual calcium silicate hydrate grains 15 in turn consist of microporous calcium silicate hydrate material, particularly of autoclaved aerated concrete material. It lies within the scope of the invention to use at least one other fine-particle, non-swelling, mineral, porous material, for example limestone powder, instead of or in addition to the calcium silicate hydrate powder.

The bentonite powder or the fine-particle bentonite of the outer mantle layer 8 particularly has a grain size ≤200 μm, preferably ≤100 μm according to DIN EN 933/1.

As has already been explained, hydrocolloid grains 10 composed of a hydrocolloid that swells in cold water and particularly is soluble in cold water are furthermore present on the outer mantle layer surface 9, according to the invention. In this connection, the hydrocolloid grains 10 are not disposed to cover the full area, but are separately distributed over the entire mantle layer surface 9. In particular, less than 50% of the mantle layer surface 9 is covered with the hydrocolloid grains 10. The individual hydrocolloid grains 10 preferably consist of starch that swells in cold water and is particularly soluble in cold water, or of hydroxyethylcellulose or carboxymethylcellulose or methylhydroxyethylcellulose and/or xanthan. Preferably, initial swelling of the hydrocolloid is furthermore also delayed. A delay in initial swelling means that after the hydrocolloid is mixed with water, a certain amount of time elapses until the hydrocolloid increases the viscosity of the mixture, but then this viscosity increase happens as suddenly as possible.

Production of the hygiene granulate, according to the invention, proceeds as follows:

First, the individual solid components of the intermediate layer 5, in other words the calcium silicate hydrate powder, the meal-type starch (=starch meal), and the meal-type hydrocolloid that is different from starch (=hydrocolloid meal) are premixed, dry, in a batch mixer. Production therefore takes place in batch operation. Preferably, a proportion of at least 95 mass-% of the starch meal has a grain size <100 μm, especially <25 μm according to DIN EN 933/1. The starch meal is therefore in very fine-particle form. The hydrocolloid that is different from starch preferably has a grain size ≤500 μm, preferably ≤125 μm.

After dry premixing, water is added while mixing continuously, and the whole lot is mixed to form a slurry or suspension. The amount of water added preferably amounts to 60 to 150 mass-%, especially 70 to 130 mass-%, with reference to the dry mass of the suspension. The starch and the hydrocolloid that is different from starch begin to swell and possibly to dissolve, and form the gel, which is aqueous at first, or the gel matrix 16, which is aqueous at first, in which the calcium silicate hydrate grains 14 of the calcium silicate hydrate powder are distributed.

Subsequently, the bentonite powder 4 and a granulate composed of the carrier grains 2 are simultaneously added to the suspension, and mixed in in such a manner that the carrier grains 2 are completely mantled by the suspension. The suspension is applied to the carrier grains 2. The granulate moisture of the granulate of the carrier grains 2 preferably amounts to ≤40 mass-%, especially ≤30 mass-%. Because the bentonite powder 4 and the carrier grains 2 are added simultaneously, the bentonite powder is partly deposited on the carrier grain surface 3, is pressed down planar there, and partly penetrates into the pores 12 of the carrier grains 2 (see FIG. 1), before the carrier grains 2 are mantled with the suspension. Therefore first, individual precursor granules form, composed of one carrier grain 2, in each instance, which has bentonite powder 4 at the carrier grain surface 3, whereby the carrier grain 2 and the bentonite powder 4 are mantled with the suspension. The suspension, after drying, forms the subsequent intermediate layer 5.

Subsequently, in other words after the suspension is applied to the carrier grains 2 and after formation of the first precursor granules, a further hydrocolloid meal, particularly starch meal, is added to the first precursor granules in the batch mixer. The hydrocolloid meal preferably has a grain size ≤500 μm, preferably ≤200 μm according to DIN EN 933/1. By continuing mixing, the grains of the hydrocolloid meal, particularly of the starch meal, bind water from the suspension, swell, and form the hydrocolloid gel 7, particularly starch gel, which is at first aqueous, and deposits on the intermediate layer surface 6 of the individual first precursor granules, is smeared over these, and pressed into these. Second precursor granules consisting of a carrier grain 2, in each instance, which has the bentonite powder 4 on the carrier grain surface 3, are formed, whereby the carrier grain 2 and the bentonite powder 4 are mantled with the intermediate layer 5, whereby the aqueous hydrocolloid gel 7 is disposed on the intermediate layer surface 6.

Afterward, the calcium silicate hydrate powder and the bentonite powder are simultaneously added to the second precursor granulates in the running batch mixer, to form the outer mantle layer 8. By means of mixing the second precursor granules with the calcium silicate hydrate powder and the bentonite powder, the second precursor granules are mantled with a mixture of the calcium silicate hydrate powder and the bentonite powder. Because the individual second precursor granules bump against one another during mixing, the calcium silicate hydrate powder and the bentonite powder are mixed and compressed or agglomerated or compacted. The binder matrix 18 composed of bentonite powder is formed, in which the calcium silicate hydrate grains 15 are embedded. Furthermore, the bentonite powder and the calcium silicate hydrate powder are pressed into the aqueous hydrocolloid gel 7. The aqueous hydrocolloid gel 7 thereby connects the intermediate layer 5 and the outer mantle layer 8 with one another.

Therefore the outer mantle layer 8 is formed from the two solids that have been mixed and agglomerated with one another, namely the calcium silicate hydrate powder and the bentonite powder. Third precursor granules composed of a carrier grain 2, in each instance, are formed, whereby the carrier grain 2 is mantled with the intermediate layer 5, and the bentonite powder 4 is disposed between the intermediate layer 5 and the carrier grain 2, and whereby the intermediate layer 5 is mantled with the outer mantle layer 8, and the hydrocolloid gel 7 is disposed between the intermediate layer 5 and the outer mantle layer 8.

Subsequently, a further meal-type hydrocolloid that swells in cold water, particularly is soluble in cold water (=hydrocolloid meal) composed of the hydrocolloid grains 10 is mixed into the third precursor granules. The hydrocolloid meal preferably has a grain size ≤500 μm, preferably ≤125 μm according to DIN EN 933/1. By the continuous mixing, the individual hydrocolloid grains 10 of the hydrocolloid meal are deposited on the mantle surface 9 of the individual third precursor grains, in each instance, and are pressed slightly into the outer mantle layer 8, in each instance. The granules 1 according to the invention, which have not, however, dried yet, are formed.

Afterward, the hygiene granulate that has been produced is dried, particularly to a residual moisture of <15 to <5 mass-% In this connection, the aqueous gels also dry, at least in part, in each instance.

In the production of the hygiene granulate, according to the invention, not only the individual materials as such but also the sequence of the individual method steps and the proportions of the materials, in each instance, with reference to the total amount of solids added, are important. Preferred compositions are listed in the table below:

| | Proportion with reference to amount of solid added [mass-%] | |
|---|---|---|
| | | preferably |
| Granulate composed of carrier grains, particularly of calcium silicate hydrate material | 20 to 70 | 30 to 60 |
| Bentonite powder or superabsorber meal (added together with carrier grains) | 0.2 to 5 | 0.5 to 3 |
| Calcium silicate hydrate powder for suspension | 15 to 65 | 20 to 50 |
| Starch meal for suspension | 0.5 to 5 | 1 to 4 |
| Hydrocolloid meal for suspension | 0.1 to 5 | 1 to 4 |
| Starch meal for intermediate layer surface | 0.1 to 5 | 0.1 to 2 |
| Bentonite powder for outer mantle layer | 10 to 25 | 15 to 25 |
| Calcium silicate hydrate powder for outer mantle layer | 2 to 10 | 3 to 8 |
| Hydrocolloid meal for mantle surface | 0.1 to 10 | 0.1 to 5 |

A preferred exemplary embodiment was produced as follows, in a batch mixer (the amount information relates to the total amount of solids added):
1. Dry premixing of 23.9 mass-% calcium silicate hydrate powder moist from production+1.9 mass-% starch meal+ 0.7 mass-% hydroxyethylcellulose,
2. mixing of the premixed components with 20 mass-% water (with reference to the total dry weigh-in), to produce a suspension,
3. simultaneous addition of 43 mass-% calcium silicate hydrate granulate and 1.1 mass-% bentonite powder to the suspension,
4. after granulation, addition of 0.7 mass-% starch meal,
5. addition of 22.3 mass-% bentonite powder+6 mass-% calcium silicate hydrate powder,
6. after formation of an outer mantle layer, addition of 0.4 mass-% hydroxyethylcellulose,
7. drying of the granules.

The hygiene granulate according to the invention or produced according to the invention demonstrates very good clumping properties with low bulk density. Preferably, the hygiene granulate according to the invention or produced according to the invention demonstrates a bulk density of <800 kg/m$^3$, preferably <600 kg/m$^3$. The low bulk density is achieved, on the one hand, by the porous carrier grain, and, on the other hand, by the proportion of calcium silicate hydrate powder both in the intermediate layer and in the outer mantle layer. This low bulk density is achieved because calcium silicate hydrate powder is clearly lighter than bentonite because of its microporosity. Also, the starch and the hydrocolloid contribute to the low bulk density. This contribution arises because both the starch and the hydrocolloid lead to clumping. As a result, it was possible to reduce the proportion of bentonite in the hygiene granulate according to the invention, and thereby to clearly lower the bulk density.

For one thing, the bentonite in the outer mantle layer as well as the starch and the hydrocolloid ensure the excellent clumping properties of the hygiene litter. When liquid is added, first the bentonite present in the outer mantle layer swells, and, with some delay, the hydrocolloid present on the mantle surface swells. Both of these actions lead to immediate clumping of the granules with one another.

As soon as the liquid has penetrated to the intermediate layer, the gel contained in this layer, composed of hydrocolloid and starch, as well as the hydrocolloid gel, particularly starch gel, on the intermediate layer surface, also swell. The starch and the hydrocolloid become sticky, when this swelling happens, and improve the cohesion of the individual layers of the granules, on the one hand, and of the clumps, in other words of the individual granules with one another, on the other hand. This improvement means that the sticky intermediate layer guarantees that the outer mantle layer of a granule continues to adhere to the granule and does not come loose. Because, however, the intermediate layer consists not just of starch gel and hydrocolloid gel, but also the calcium silicate hydrate powder that is contained in the intermediate layer, the granules do not become overly sticky. In this way, the granules are prevented from becoming caught in the fur of the animals, particularly of the cats.

At the same time, the hygiene granulate according to the invention demonstrates very great water absorption. Preferably, the hygiene granulate demonstrates a water absorption of >100 mass-%, preferably ≥150 mass-% according to Westinghouse. The great water absorption is particularly also achieved by means of the presence of the calcium silicate hydrate powder both in the intermediate layer and in the outer mantle layer. This great water absorption arises because the individual grains of the calcium silicate hydrate powder, in contrast to the bentonite, the hydrocolloid, and the starch, do not swell when water is added. In this way, the outer mantle layer and/or the intermediate layer are prevented from forming a barrier when they swell, through which barrier no further liquid can penetrate to the carrier grain. The absence of a barrier arises because the individual grains of the calcium silicate hydrate powder have micropores, and thereby guarantee that the liquid can penetrate through the outer mantle layer and the intermediate layer all the way to the carrier grain, and can be absorbed by the latter. Furthermore, not only bentonite but also the starch and the hydrocolloid demonstrate very good swelling capacity, and also contribute to the great water absorption of the hygiene granulate according to the invention.

Furthermore, the hygiene granulate according to the invention or produced according to the invention demonstrates great wear resistance and bond strength. In particular, the starch in the intermediate layer and the hydrocolloid gel on the intermediate layer surface improve the bond strength. This improved bond strength is because the starch gel, even after drying, still demonstrates a certain stickiness, and thereby improves the bond of the outer mantle layer with the carrier grain. The intermediate layer is thereby an adhesion-mediating layer. Because of this adhesion-mediating layer, the hydrocolloid gel present at the intermediate layer surface also improves bond or cohesion of the individual granules. In particular, the hydrocolloid gel is connected with, particularly adhered to not only the intermediate layer but also the outer mantle layer.

In particular, the hydrocolloid on the mantle surface also ensures good wear resistance. It is particularly advantageous if the hydrocolloid is hydroxyethylcellulose. This advantage arises because this substance, after drying, becomes as hard as plastic and thereby clearly improves the wear resistance of the individual granules. Preferably, the n wear resistance lies at <0.5%, preferably <0.3%, determined using the abrasion tester TAR 120 from ERWEKA at 60 rpm and a time of 5 min.

Also with regard to the production method, an inventive selection of the individual method steps and the individual materials was made. For example, it was determined, within the scope of the invention, that at an overly high granulate moisture of the carrier grains, clumping of the hygiene litter produced is clearly worse. Surprisingly, however, even a small amount of bentonite powder or superabsorber meal, added at the same time with the granulate composed of carrier grains, is sufficient to clearly improve the clumping behavior. The bentonite powder or superabsorber meal obviously binds excess moisture from the carrier grains. In this way, variations in granulate moisture, in particular, can be evened out without problems. In other words, the production method becomes un-susceptible to variations in granulate moisture. Nevertheless, it lies within the scope of the invention to dry the granulate ahead of time.

Furthermore, it was determined, within the scope of the invention, that the proportion of starch added to the slurry or to the suspension should be limited. The proportion of added starch should be limited because an overly high proportion of starch leads to the result that the suspension becomes overly viscous and sticky, so that granulation becomes difficult to impossible. In order to nevertheless achieve a good bond between outer mantle layer and carrier grain, however, starch is applied to the intermediate layer surface, according to a preferred aspect of the invention, or provided between the intermediate layer and the outer mantle layer. The starch swells slightly and forms starch gel, so that the bentonite powder and the calcium silicate hydrate powder of the outer mantle layer are pressed into the starch gel and adhere to it. Furthermore, the starch gel remains sticky even after it dries, and ensures a good bond. Surprisingly, in this connection, a small amount of starch is sufficient.

The use of a hydrocolloid with delayed swelling for the suspension is also advantageous, because it does not swell completely during production, but rather only when the hygiene granulate is used.

Figure 2:
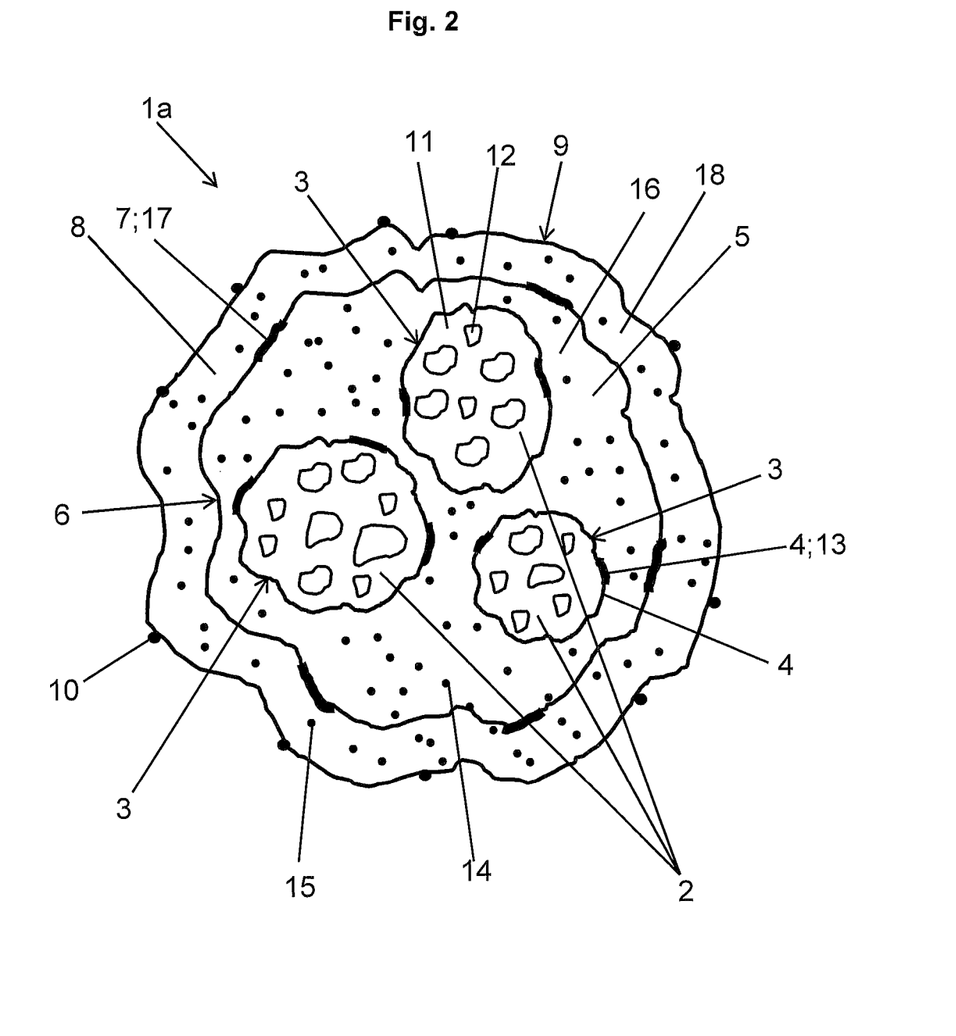
FIG. 2 shows, schematically, a granule of the hygiene granulate according to the invention, in cross-section, according to another embodiment.

In this connection, it also lies within the scope of the invention that a granule 1a has multiple carrier grains 2 (see FIG. 2). These multiple carrier grains cannot be prevented during production. The carrier grains 2 with the bentonite powder 4 disposed on them are then sheathed by the intermediate layer 5. Otherwise, the structure of the granule 1a is the same.

Furthermore, it lies within the scope of the invention that the outer mantle layer contains fragrances.

Although only a few embodiments of the present invention have been shown and described, it is to be understood that many changes and modifications may be made thereunto without departing from the spirit and scope of the invention.

What is claimed is:

1. A clump-forming hygiene granulate comprising a plurality of individual granules, wherein each granule comprises:
   (a) at least one inner carrier grain composed of a porous, mineral, non-swelling carrier material;
   (b) an intermediate layer mantling the at least one inner carrier grain, wherein said intermediate layer comprises a first mixture that contains at least one first powder of a non-swelling, mineral, porous first material and a gel matrix composed at least of starch that swells in cold water and a first hydrocolloid that swells in cold water different from the starch;
   (c) a bentonite powder or a superabsorber meal disposed between the at least one inner carrier grain and the intermediate layer;
   (d) an outer mantle layer sheathing the intermediate layer having a mantle layer surface, wherein the outer mantle layer comprises a second mixture that contains at least a second powder of a non-swelling, mineral, porous second material and bentonite powder;
   (e) a hydrocolloid gel that swells in cold water disposed between the outer mantle layer and the intermediate layer; and
   (f) a plurality of hydrocolloid grains of a second hydrocolloid that swells in cold water distributed on the mantle layer surface.

2. The clump-forming hygiene granulate according to claim 1, wherein one of the first powder of a non-swelling, mineral, porous first material of the intermediate layer and the second powder of a non-swelling, mineral, porous second material is calcium silicate hydrate powder.

3. The clump-forming hygiene granulate according to claim 2, wherein the calcium silicate hydrate powder of the outer mantle layer has a grain size ≤1000 μm according to DIN EN 933/1.

4. The clump-forming hygiene granulate according to claim 3, wherein the grain size of the calcium silicate hydrate powder of the outer mantle layer is ≤300 μm according to DIN EN 933/1.

5. The clump-forming hygiene granulate according to claim 1, wherein each of the first hydrocolloid, the hydrocolloid gel and the hydrocolloid grains is soluble in cold water.

6. The clump-forming hygiene granulate according to claim 1, wherein the hydrocolloid gel disposed between the outer mantle layer and the intermediate layer is starch gel.

7. The clump-forming hygiene granulate according to claim 1, wherein the carrier material is a porous, calcium silicate hydrate material.

8. The clump-forming hygiene granulate according to claim 7, wherein the porous calcium silicate hydrate material is autoclaved aerated concrete material.

9. The clump-forming hygiene granulate according to claim 1, wherein the at least one inner carrier grain has an outer grain surface, wherein the bentonite powder which is disposed between the at least one inner carrier grain and the intermediate layer is distributed on the outer grain surface.

10. The clump-forming hygiene granulate according to claim 9, wherein the bentonite powder is distributed on the outer grain surface in form of material agglomerates.

11. The clump-forming hygiene granulate according to claim 1, wherein grains of the first powder of the non-swelling, mineral, porous first material are embedded in the gel matrix.

12. The clump-forming hygiene granulate according to claim 1, wherein the bentonite powder disposed between the at least one inner carrier grain and the intermediate layer has a grain size ≤200 μm according to DIN EN 933/1.

13. The clump-forming hygiene granulate according to claim 12, wherein the grain size of the bentonite powder is ≤100 μm according to DIN EN 933/1.

14. The clump-forming hygiene granulate according to claim 1, wherein the inner carrier grains of the granulate have a grain size ≤6 mm according to DIN EN 933/1.

15. The clump-forming hygiene granulate according to claim 14, wherein the grain size is ≤4 mm according to DIN EN 933/1.

16. The clump-forming hygiene granulate according to claim 1, wherein the first powder of the non-swelling, mineral, porous first material has a grain size ≤1000 μm according to DIN EN 933/1.

17. The clump-forming hygiene granulate according to claim 16, wherein the grain size of the first powder of the non-swelling, mineral, porous first material is ≤300 μm according to DIN EN 933/1.

18. The clump-forming hygiene granulate according to claim 1, wherein the first hydrocolloid different from the starch is at least one of hydroxyethylcellulose, carboxymethylcellulose, methylhydroxyethylcellulose, and xanthan.

19. The clump-forming hygiene granulate according to claim 1, wherein the first hydrocolloid different from the starch swells with a delay.

20. The clump-forming hygiene granulate according to claim 1, wherein the bentonite powder of the outer mantle layer has a grain size ≤200 μm according to DIN EN 933/1.

21. The clump-forming hygiene granulate according to claim 20, wherein the grain size of the bentonite powder of the outer mantle layer is ≤100 μm according to DIN EN 933/1.

22. The clump-forming hygiene granulate according to claim 1, wherein the hygiene granulate has a water absorption of >100 mass-% according to Westinghouse.

23. The clump-forming hygiene granulate according to claim 22, wherein the water absorption is ≥150 mass-% according to Westinghouse.

24. The clump-forming hygiene granulate according to claim 1, wherein the hygiene granulate is an animal litter or a cat litter.

25. A method for producing in a mixer operated in batch operation a clump-forming hygiene granulate comprising a plurality of granules, wherein each granule comprises at least one carrier grain composed of a porous, mineral, non-swelling carrier material and a multilayer mantle sheathing the at least one carrier grain, said method comprising:

(a) producing a suspension composed of water, a first powder of a non-swelling, mineral, porous first material, starch meal, and a meal-type first hydrocolloid different from starch;
(b) simultaneously adding into the mixer a precursor granulate comprising a plurality of carrier grains of a porous, mineral, non-swelling carrier material and at least one of a bentonite powder and a superabsorber meal;
(c) adding a first hydrocolloid meal into the mixer;
(d) simultaneously adding bentonite powder and calcium silicate hydrate powder into the mixer;
(e) adding a second hydrocolloid meal into the mixer; and
(f) drying the granules produced to form the clump-forming hygiene granulate.

26. The method according to claim 25, wherein the first powder of the non-swelling, mineral porous first material of the suspension is calcium silicate hydrate powder.

27. The method according to claim 25, wherein the first hydrocolloid meal is starch meal.

28. The method according to claim 25, wherein the second hydrocolloid meal is starch meal.

29. The method according to claim 25, wherein the suspension is formed by premixing in a dry state the first powder of the non-swelling, mineral porous first material, the starch meal, and the meal-type first hydrocolloid, and subsequently adding the water.

30. The method according to claim 25, wherein the bentonite powder and the carrier grains, which are simultaneously added to the suspension, are mixed with the suspension in such a manner that individual first precursor granules composed of the carrier grains mantled with the suspension are formed.

31. The method according to claim 30, wherein the first hydrocolloid meal is admixed to the first precursor granules in such a manner that (a) hydrocolloid grains of the first hydrocolloid meal absorb water from the suspension, swell, and form a hydrocolloid gel, wherein the hydrocolloid gel deposits on surfaces of the first precursor granules, and (b) second precursor granules form.

32. The method according to claim 31, wherein the bentonite powder and the calcium silicate hydrate powder are admixed to the second precursor granules in such a manner that the second precursor granules are mantled with the bentonite powder and the calcium silicate hydrate powder.

33. The method according to claim 25, wherein individual solid components of the clump-forming hygiene granulate have the following proportions:

|  | Proportion with reference to amount of solid added [mass-%] |
|---|---|
| Granulate composed of carrier grains hydrate material | 20 to 70 |
| Bentonite powder or superabsorber meal (added together with carrier grains) | 0.2 to 5 |
| Calcium silicate hydrate powder for suspension | 15 to 65 |
| Starch meal for suspension | 0.5 to 5 |
| Hydrocolloid meal for suspension | 0.1 to 5 |
| Starch meal for intermediate layer surface | 0.1 to 5 |
| Bentonite powder for outer mantle layer | 10 to 25 |
| Calcium silicate hydrate powder for outer mantle layer | 2 to 10 |
| Hydrocolloid meal for outer mantle surface. | 0.1 to 10 |

34. The method according to claim 33, wherein the proportions are as follows:

|  | Proportion with reference to amount of solid added [mass-%] |
|---|---|
| Granulate composed of carrier grains hydrate material | 30 to 60 |
| Bentonite powder or superabsorber meal (added together with carrier grains) | 0.5 to 3 |
| Calcium silicate hydrate powder for suspension | 20 to 50 |
| Starch meal for suspension | 1 to 4 |
| Hydrocolloid meal for suspension | 1 to 4 |
| Starch meal for intermediate layer surface | 0.1 to 2 |
| Bentonite powder for outer mantle layer | 15 to 25 |
| Calcium silicate hydrate powder for outer mantle layer | 3 to 8 |
| Hydrocolloid meal for outer mantle surface. | 0.1 to 5 |

35. The method according to claim 25, wherein an animal litter or a cat litter is produced.

* * * * *